Patented June 13, 1950

2,511,722

UNITED STATES PATENT OFFICE 2,511,722

METHOD OF PRODUCING LATEX ARTICLES

Francis Lepetit, Paris, France, assignor to Societe a Responsabilite Limitee dite: Societe Auxiliaire de L'Institut Francais du Caoutchouc, Paris, France No Drawing. Application January 28, 1947, Serial No. 724,917. In France February 22, 1946

7 Claims. (Cl. 195—2)

Most of the methods of producing latex articles are based upon the addition of a sensitizing agent (e. g. an ammonium salt in Kaisam's process) to the latex, whereby the latter is made instable and heat-sensitive. These methods suffer notably from the following inconveniences:

1. The addition of a sensitizer constitutes an additional operation which generally has to be carried out just at molding time and which has the consequence of diluting the mix.

2. The sensitizer is already active at normal temperature, whereby at first the mix is thickened slowly and then gelified, with the result that bubble removal is retarded and pouring interfered with. Mixes which are sensitized in this manner must be used immediately and the surplus portion thereof cannot be re-used.

3. In order to prevent unsatisfactory ageing or the formation of superficial efflorescences it is necessary to remove the sensitizer by washing the coagulum with warm water, a time-consuming operation that will already take several hours with thin-walled articles. Since such washing is only effective with thin articles, these methods are of no use in the production of thick articles.

In order to overcome these inconveniences it has been attempted to dispense with using a stabilizer by making latex capable of being coagulated by the mere action of heat.

In this connection it is already known that Hevea latex can be sentized, i. e. be made heat-coagulatable, by the addition thereto of a definite percentage, generally 2 to 4%, of zinc oxide, a substance which besides is a usual ingredient in latex mixes. However, while this method will give good results with particular latices, it is completely ineffective with others. Consequently, it will not enable by itself to safely undertake latex product molding operations of any kind irrespective of the latex used.

As a result of methodic research work I have now found that ammoniated latex of any kind, inclusive of newly gathered latex, can be molded in the hot by subjecting the same at first to an artificial ageing treatment and only thereafter admixing the latex thus aged with a definite percentage of zinc oxide and contingently vulcanizing agents, then introducing the mixture thus obtained into a mold and heating it to a definite temperature.

An ageing method is preferaby chosen that will modify the latex only to a limited degree and that will result in the formation of a reticular coagulum following the addition of zinc oxide and the application of heat; thus, while drying, the coaglum will retain a shape which is perfectly homothetic with that of the mold in which it has been formed, which is essential.

For instance, the treatment may be carried out:

By mechanical means, such as centrifuging or creaming, whereby part of the original proteins are eliminated and it becomes even possible to replace them by other agents capable of securing satisfactory stability in the cold without interferring with coagulation by heat;

By chemical means, for instance the action of ammonia in the hot and under pressure;

By biological means, such as the action of ferments or enzymes, e. g. trypsin.

Besides, these various methods may be used in combinations.

Of course, in view of the properties of the latex thus treated, this method is also applicable to other manufacturing processes, notably dipping.

The following treatments may be indicated by way of exemplification and by no means of limitation:

*Example 1.*—Fresh Hevea latex having a concentration of 40% and containing 0.7% of ammonia, to which 3% of zinc oxide are admixed in the form of an aqueous dispersion prepared as is usual in the rubber industry, is completely devoid of sensitiveness to heat.

If the same latex be subjected at first to a creaming process by which its rubber cencentration is raised to 58% (the ammonia concentration being maintained at 0.7%) and then enclosed in a sealed tube and heated in an autoclave for 3 hours at a temperature of 140° C., it will be found that once admixed with 3% of zinc oxide in the form of the same dispersion as described hereinbefore the said latex is perfectly heat-sensitive. It will coagulate within 3 minutes at a temperature of 70° C. while retaining its stability for several weeks at normal temperature.

In addition, it can be admixed in the cold with the usual vulcanizing agents so that once dry the molded rubber article will have a shape exactly homothetic with that of the mold in which coagulation was carried out, its mechanical properties moreover being excellent and its ageing characteristics in the vulcanized state quite satisfactory.

*Example 2.*—To fresh latex having a concentration of 40% and containing 0.8% of ammonia there are added 10 cc. per litre of a 10 percent solution of pancreatic extract (i. e. 1 part per thousand). The latex thus treated can easily be made heat-sensitive with ZnO following a ripening process carried out for two days at normal temperature and a concentration process by creaming or otherwise.

*Example 3.*—The procedure is the same as according to Example 2, the latex however being preparatorily concentrated by creaming and the amount of pancreatic extract admixed being of 0.5 par per thousand.

What I claim as my invention and desire to secure by Letters Patent is:

1. A process for the heat-sensitizing of ammoniated latex for manufacturing molded articles comprising subjecting the ammoniated latex to the action of proteolytic ferments degrading the proteins of the latex and without separating the products of degradation from the serum obtained and then adding zinc oxide and normal vulcanizing ingredients being added in the usual manner for subsequent vulcanization.

2. A process for the heat-sensitizing of ammoniated latex according to claim 1 wherein the degrading is carried out with trypsin.

3. A process for the heat-sensitizing of ammoniated latex in accordance with claim 1 wherein the degrading is caried out with papain.

4. A process for the manufacture of molded articles of ammoniated latex comprising subjecting the ammoniated latex to the action of proteolytic ferments degrading the proteins of the latex, said latex so treated retaining the degradation products formed, then adding in the usual manner to said latex zinc oxide and vulcanizing agents, and then heating said latex in a mold.

5. A process for the manufacture of molded articles of ammoniated latex comprising adding 10 cc. per litre of a 10% solution of pancreatic extract to fresh Hevea latex having a concentration of 40% and containing 0.8% of ammonia, then ripening said latex so treated for at least two days at normal temperature, then concentrating said product, then mixing therewith an aqueous dispersion of zinc oxide, then adding thereto cold vulcanizing ingredients and finally coagulating and drying the product in a mold while retaining therein the degradation products of the proteins of said latex.

6. A process for the manufacture of molded articles of ammoniated latex comprising creaming fresh Hevea latex having a concentration of 40% and containing 0.7% of ammonia until the concentration of rubber is raised to 58%, the concentration of ammonia being maintained at 0.7%, then heating the product to 140° C. for approximately three hours in an autoclave, then adding to the product zinc oxide in aqueous dispersion and vulcanizing ingredients and then finally coagulating and drying the product in a mold while retaining therein the degradation products of the proteins of said latex.

7. A process for the manufacture of molded articles of ammoniated latex comprising first creaming fresh Hevea latex having a concentration of 40% and containing 0.8% ammonia to increase the rubber concentration, then adding to the product 0.5 part of pancreatic extract for each 1000 parts, then ripening said product for at least two days at normal temperature, then mixing said product with an aqueous dispersion of zinc oxide, then adding thereto vulcanizing ingredients and finally coagulating and drying said product in a mold while retaining therein the degradation products of the proteins of said latex.

FRANCIS LEPETIT.

REFERENCES CITED

The following references are of record in the file of this patent:

UNITED STATES PATENTS

| Number | Name | Date |
|---|---|---|
| 1,632,759 | Hopkinson et al. | June 14, 1927 |
| 1,770,092 | Sutton | July 8, 1930 |
| 1,890,578 | Hayes et al. | Dec. 13, 1932 |
| 1,939,635 | Townsend | Dec. 12, 1933 |
| 2,097,481 | Wallerstein | Nov. 2, 1937 |